US009262443B2

(12) United States Patent
Tin (10) Patent No.: US 9,262,443 B2
(45) Date of Patent: Feb. 16, 2016

(54) CLASSIFYING MATERIALS USING TEXTURE

(71) Applicant: CANON KABUSHIKI KAISHA, Tokyo (JP)

(72) Inventor: Siu-Kei Tin, Milpitas, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 450 days.

(21) Appl. No.: 13/894,592

(22) Filed: May 15, 2013

(65) Prior Publication Data

US 2014/0341436 A1 Nov. 20, 2014

(51) Int. Cl.
| | | |
|---|---|---|
| *G06F 17/30* | (2006.01) | |
| *G06T 7/40* | (2006.01) | |
| *G06T 3/40* | (2006.01) | |
| *G06T 3/00* | (2006.01) | |
| *G06K 9/46* | (2006.01) | |

(Continued)

(52) U.S. Cl.
CPC ........ *G06F 17/30262* (2013.01); *G06F 17/301* (2013.01); *G06F 17/30103* (2013.01); *G06F 17/30247* (2013.01); *G06K 9/4619* (2013.01); *G06K 9/6212* (2013.01); *G06T 3/0056* (2013.01); *G06T 3/0068* (2013.01); *G06T 3/0093* (2013.01); *G06T 3/40* (2013.01); *G06T 3/4007* (2013.01); *G06T 7/401* (2013.01); *G06T 7/407* (2013.01); *G06K 2209/19* (2013.01); *G06T 7/0004* (2013.01); *G06T 7/0024* (2013.01); *G06T 2207/30108* (2013.01); *G06T 2207/30161* (2013.01)

(58) Field of Classification Search
CPC .............. G06K 9/6212; G06K 9/4619; G06K 2209/19; G06T 7/401; G06T 7/407; G06T 3/40; G06T 3/4007; G06T 3/0093; G06T 3/0056; G06T 3/0068; G06T 7/0004; G06T 7/0024; G06T 2207/30108; G06T 2207/30161; G06F 17/30247; G06F 17/30262; G06F 17/301; G06F 17/30103

See application file for complete search history.

(56) References Cited

U.S. PATENT DOCUMENTS

| 4,827,433 | A | * | 5/1989 | Kamon | .......................... | 345/668 |
| 5,085,517 | A | * | 2/1992 | Chadwick et al. | ............ | 356/394 |
| 5,333,052 | A | * | 7/1994 | Finarov | ......................... | 356/369 |

(Continued)

OTHER PUBLICATIONS

Varma, et al., "A Statistical Approach to Material Classification Using Image Patch Exemplars", IEEE Transactions of Pattern Analysis and Machine Intelligence, vol. 31, No. 11, Nov. 2009.

(Continued)

*Primary Examiner* — Manav Seth
(74) *Attorney, Agent, or Firm* — Fitzpatrick, Cella, Harper & Scinto (57) ABSTRACT

An unknown material is classified using texture. A database of predetermined images is accessed, each of a known material and each captured at a magnification factor that is relatively high. A query image of the unknown material is received. The query image is captured at a second magnification factor that is relatively lower than the magnification factors of the predetermined images. A collection of images of the known materials is dynamically generated at the second magnification factor. The received query image is matched against the dynamically generated collection of images, and the unknown material is classified in correspondence to a match between the received image and the dynamically generated collection of images.

20 Claims, 8 Drawing Sheets

(51) Int. Cl.
*G06K 9/62* (2006.01)
*G06T 7/00* (2006.01)

(56) References Cited

U.S. PATENT DOCUMENTS

| | | | |
|---|---|---|---|
| 6,313,423 B1* | 11/2001 | Sommer et al. | 209/587 |
| 6,381,365 B2* | 4/2002 | Murakawa | 382/190 |
| 6,803,919 B1* | 10/2004 | Kim et al. | 345/582 |
| 6,912,527 B2* | 6/2005 | Shimano et al. | |
| 7,043,094 B2* | 5/2006 | Thomas et al. | 382/305 |
| 7,095,893 B2* | 8/2006 | Reiners | 382/209 |
| 7,188,099 B2* | 3/2007 | Kim et al. | 707/754 |
| 7,379,627 B2* | 5/2008 | Li et al. | 382/305 |
| 7,449,655 B2* | 11/2008 | Cowling et al. | 209/577 |
| 7,499,806 B2* | 3/2009 | Kermani et al. | 702/19 |
| 7,564,994 B1* | 7/2009 | Steinberg et al. | 382/118 |
| 7,672,517 B2* | 3/2010 | Buscema | 382/232 |
| 7,680,330 B2 | 3/2010 | Leung | |
| 7,827,220 B2* | 11/2010 | Saito | 358/1.16 |
| 7,840,059 B2 | 11/2010 | Winn et al. | |
| 8,050,503 B2* | 11/2011 | Dekel et al. | 382/209 |
| 8,760,638 B2* | 6/2014 | Imai et al. | 356/73 |
| 8,861,844 B2* | 10/2014 | Chittar et al. | 382/162 |
| 9,082,071 B2* | 7/2015 | Skaff | |
| 2004/0184660 A1* | 9/2004 | Treado et al. | 382/191 |
| 2009/0092281 A1* | 4/2009 | Treado et al. | 382/100 |
| 2011/0243450 A1* | 10/2011 | Liu | 382/190 |
| 2011/0314031 A1* | 12/2011 | Chittar et al. | 707/749 |
| 2014/0133734 A1* | 5/2014 | Sze | 382/141 |
| 2014/0201126 A1* | 7/2014 | Zadeh et al. | 706/52 |
| 2015/0070703 A1* | 3/2015 | Tin et al. | 356/445 |

OTHER PUBLICATIONS

Blunsden, et al., "Investigating the effects of scale in MRF texture classification", 2009.

Kadir, et al., "Saliency, Scale and Image Description", International Journal of Computer Vision 45(2), 83-105, 2001.

Paget, et al., "Texture Synthesis and Unsupervised Recognition with a Nonparametric Multiscale Markov Random Field Model", IEEE Transactions on Pattern Analysis and Machine Intelligence, 1997.

Caputo, et al., "Classifying materials in the real world", Image and Vision Computing 28, 150-163, 2010.

Varma, et al., "A Statistical Approach to Texture Classification from Single Images", International Journal of Computer Vision, 2005.

Efros, et al., "Image Quilting fr Texture Synthesis and Transfer", Proc. SIGGRAPH, 2001.

* cited by examiner

CLASSIFYING MATERIALS USING TEXTURE

FIELD

The present disclosure relates to classifying materials using texture, and more particularly relates to classifying materials using captured texture images.

BACKGROUND

In the field of material classification, it is known to classify a material based on texture. For example, one approach trains a set of texture models of known material types using a set of predetermined texture images for the known material types. New texture images can then be classified by finding the closest matching texture model.

SUMMARY

With respect to material classifiers based on texture, one problem that continues to confront the art is the issue of magnification. More precisely, if the classifier is expected to recognize materials at different magnifications, then the predetermined training texture images must include images captured at these magnifications. However, it is impractical (and sometimes impossible) to predetermine a set of training images that would work for all possible magnifications.

The foregoing situation is addressed by dynamically generating a collection of images of known materials in accordance with a magnification factor of an image of an unknown material, and matching the image of the unknown material against the dynamically generated collection of images.

Thus, in an example embodiment described herein, an unknown material is classified using texture. A database of predetermined images is accessed, each of a known material and each captured at a magnification factor that is relatively high. A query image of the unknown material is received. The query image is captured at a second magnification factor that is relatively lower than the magnification factors of the predetermined images. A collection of images of the known materials is dynamically generated at the second magnification factor. The received query image is matched against the dynamically generated collection of images, and the unknown material is classified in correspondence to a match between the received image and the dynamically generated collection of images.

By dynamically generating a collection of images of known materials in accordance with a magnification factor of an image of an unknown material, it is ordinarily possible to classify the material regardless of the magnification of the image, while reducing the need to predetermine training images at every possible magnification.

In further aspects of some representative embodiments, a statistical texture feature for the query image of the unknown material is derived, and statistical texture features corresponding to each of the images in the dynamically generated collection of images are dynamically derived. Matching of the received query image against the dynamically generated collection of images includes matching of the statistical texture feature for the received query image against the statistical texture features for the dynamically generated collection of images. In one aspect, the statistical texture features each include a histogram of textons.

In other aspects, the process of dynamically generating a collection of images includes, for each predetermined image in the database of predetermined images, determining a magnification ratio between the magnification factor for the predetermined image and the second magnification factor for the received query image, synthesizing from the predetermined image a novel image of a size at least the size of the received image multiplied by the magnification ratio, and reducing the size of the synthesized novel image by a factor equal to the magnification ratio.

In yet other aspects, reducing the size of the synthesized novel image includes downsampling or resampling. In another aspect, synthesizing a novel image from the predetermined image includes replication of a part of the predetermined image and quilting of the replicated parts of the images.

In still other aspects, a statistical texture feature is derived for the query image of the unknown material, and statistical texture features are dynamically derived for each of the reduced size synthesized novel images. Matching of the received query image against the dynamically generated collection of images includes matching of the statistical texture feature for the received query image against the statistical texture features for the reduced size synthesized novel images.

In still further aspects of representative embodiments, each predetermined image in the database of predetermined images shares a common first magnification factor that is relatively high as compared to the second magnification factor. In another aspect, the magnification factor of each predetermined image in the database of predetermined images is relatively high as compared against an expected range of magnification factors for query images of unknown materials.

In one aspect, the dynamically generated collection of images includes images corresponding to all or substantially all of the predetermined images in the database of predetermined images. In another aspect, the dynamically generated collection of images includes images corresponding to substantially fewer than all of the predetermined images in the database of predetermined images, and a subset of predetermined images is selected for inclusion in the dynamically generated collection of images. The selection is based at least in part on a screening criterion.

In an additional aspect, receiving the query image of the unknown material captured includes receiving a capture setting used by an image capture device and further includes using the received capture setting to derive the second magnification factor. In one aspect, a magnification factor is an absolute magnification factor based on a ratio of physical sizes of an object and its captured image. In another aspect, a magnification factor is a relative magnification factor that is relative to a reference absolute magnification factor.

In still another aspect, the dynamic generation of the collection of images includes reducing the magnification of each corresponding one of the predetermined images to the second magnification factor.

This brief summary has been provided so that the nature of this disclosure may be understood quickly. A more complete understanding can be obtained by reference to the following detailed description and to the attached drawings.

DETAILED DESCRIPTION

Figure 1:
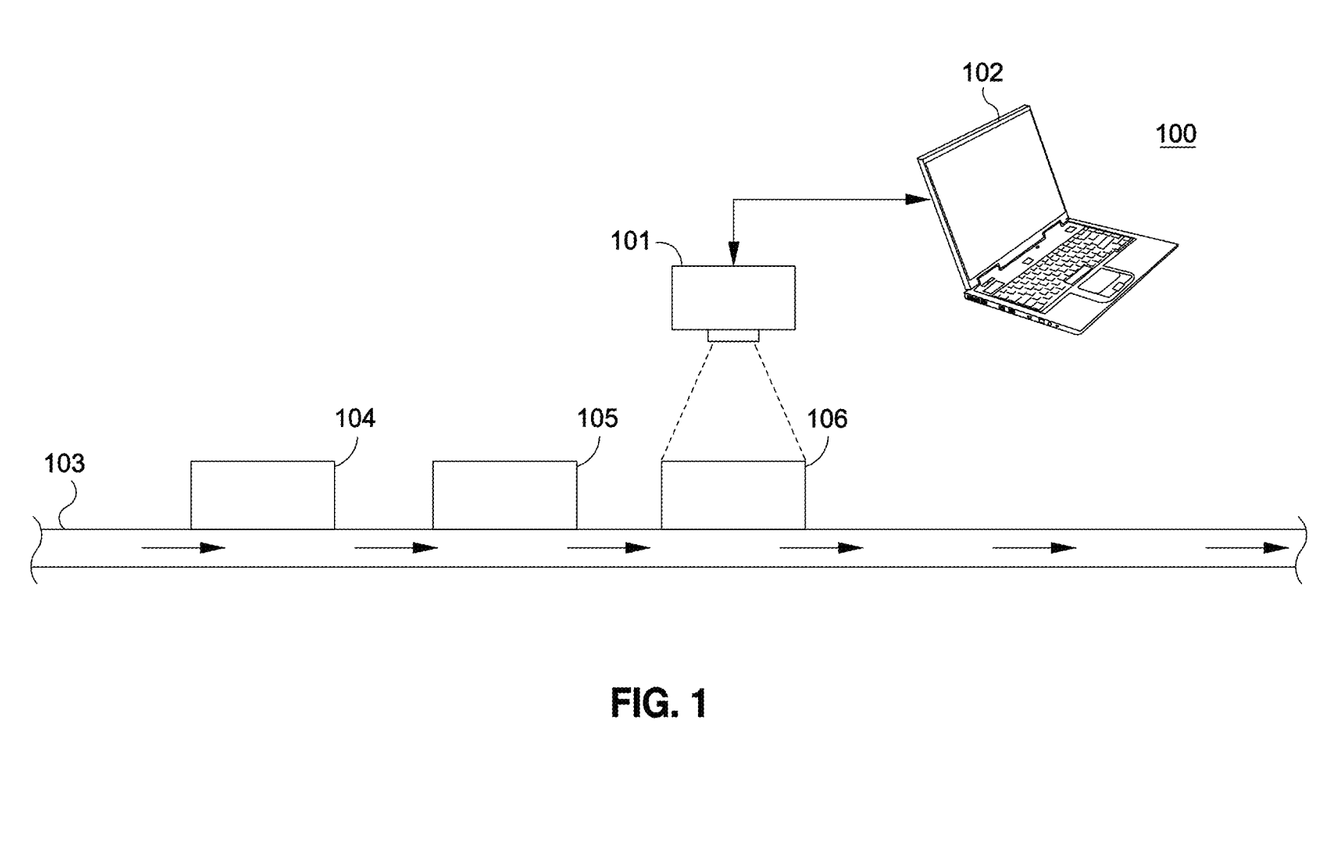
FIG. 1 illustrates an example embodiment of an environment in which aspects of the present disclosure may be practiced.

FIG. 1 illustrates an example embodiment of an environment in which aspects of the present disclosure may be practiced.

As shown in FIG. 1, image capture device 101 communicates with computer 102, and captures images of objects moving along conveyor belt 103. In particular, image capture device 101 is shown capturing an image of object 106, with objects 105 and 104 moving along conveyor belt 103 for subsequent imaging. In one aspect, FIG. 1 depicts an example of a recycling environment. In particular, the materials of which the objects 104, 105 and 106 are comprised are identified or classified using the images captured by image capture device 101, and based upon such identification or classification, are re-routed or otherwise processed based on the material. It should be understood that conveyor belt 103 is simply an example mechanism for moving objects, and other mechanisms, such as other robotic mechanisms, may be employed. In addition, although FIG. 1 depicts three objects, any number of objects may appear on conveyor belt 103 at a time.

While FIG. 1 depicts a recycling and/or sorting environment, it should be understood that this is simply an example environment in which the disclosure may be practiced, and that other environments or embodiments are of course possible. For example, material classification could also be used in the context of manufacturing, quality control, image retrieval and security, among many others.

In FIG. 1, image capture device 101 is shown as a digital still camera or a digital video camera. It is understood, however, that the following description encompasses arbitrary arrangements which can incorporate or utilize imaging assemblies with capture optics, for instance, a data processing apparatus having an image sensing function (e.g., a personal computer) or a portable terminal having an image sensing function.

Computer 102 generally comprises a programmable general purpose computer having an operating system, such as Microsoft® Windows® or Apple® Mac OS® or LINUX, and which is programmed as described below so as to perform particular functions and, in effect, become a special purpose computer when performing these functions.

While FIG. 1 depicts computer 102 as a mobile computer, computing equipment for practicing aspects of the present disclosure can be implemented in a variety of embodiments. For example, in some embodiments, the functionality of computer 102 may be incorporated into image capture device 101. In other embodiments, computer 102 may comprise, for example, a desktop computer or a computing cluster, or may include an imaging device instead of communicating with a separate image capture device 101. Other embodiments are possible according to the application and environment.

Computer 102 also includes computer-readable memory media, such as non-volatile memory 56 (shown in FIG. 2), which is constructed to store computer-readable information, such as computer-executable process steps or a computer-executable program for causing a computer to classify an unknown material using texture, as described more fully below.

Conveyor belt 103 facilitates movements of objects 104, 105, and 106 for imaging by image capture device 101, and, if necessary, onward for further processing based on the identification or classification of objects 104, 105 and 106.

Figure 2:
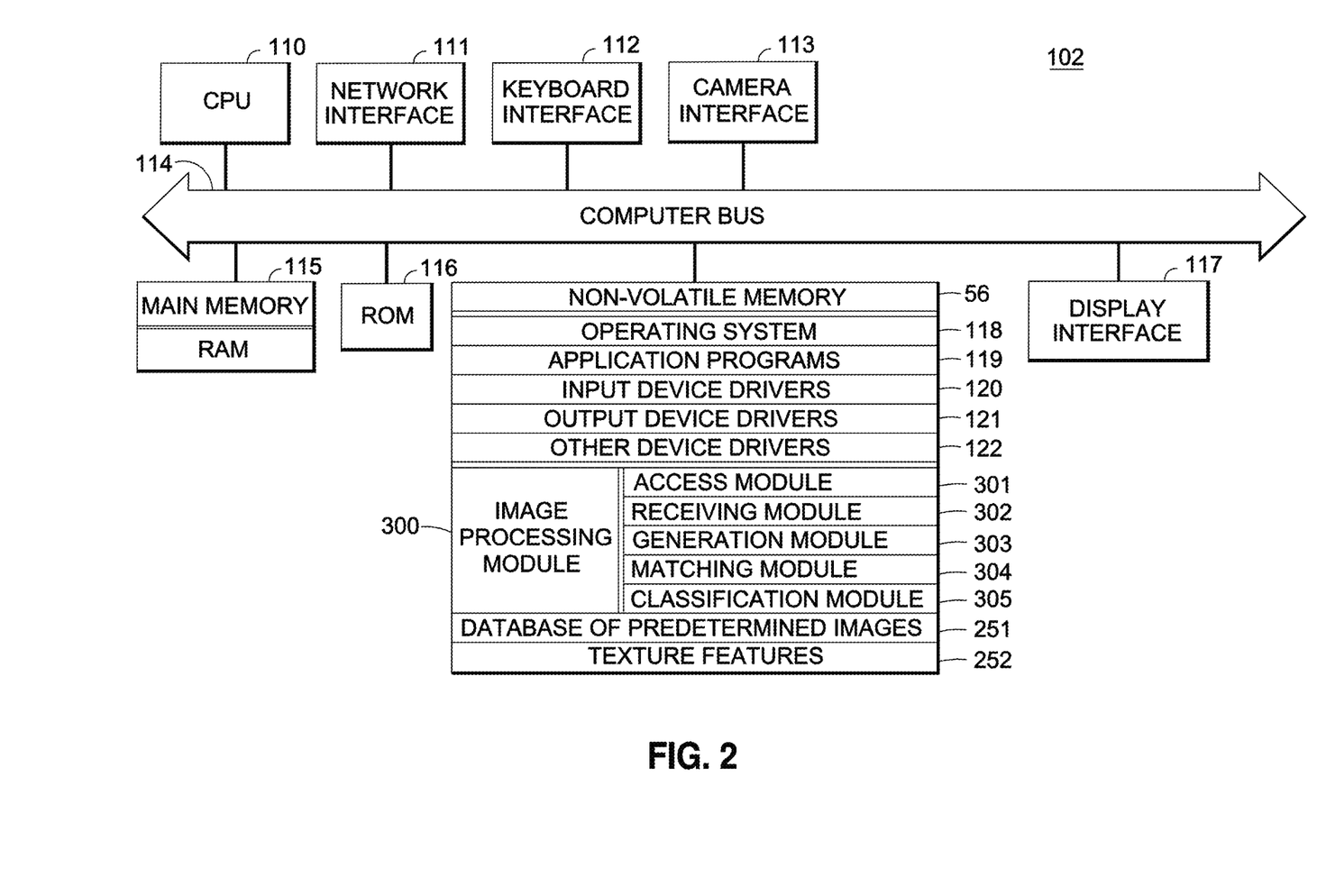
FIG. 2 is a detailed block diagram depicting the internal architecture of the computer shown in FIG. 1 according to an example embodiment.

FIG. 2 is a detailed block diagram depicting the internal architecture of the computer 102 shown in FIG. 1. As shown in FIG. 2, computer 102 includes central processing unit (CPU) 110 which interfaces with computer bus 114. Also interfacing with computer bus 114 are non-volatile memory 56 (e.g., a hard disk or other nonvolatile storage medium), network interface 111, keyboard interface 112, camera interface 113, random access memory (RAM) 115 for use as a main run-time transient memory, read only memory (ROM) 116, and display interface 117 for a display screen or other output.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from non-volatile memory 56, or another storage device into a region of RAM 115. CPU 110 can then execute the stored process steps from RAM 115 in order to execute the loaded computer-executable process steps. Data, such as a database of predetermined images or other information, can be stored in RAM 115 so that the data can be accessed by CPU 110 during the execution of the computer-executable software programs, to the extent that such software programs have a need to access and/or modify the data.

As also shown in FIG. 2, non-volatile memory 56 contains computer-executable process steps for operating system 118, and application programs 119, such as graphic image management programs. Non-volatile memory 56 also contains computer-executable process steps for device drivers for software interface to devices, such as input device drivers 120, output device drivers 121, and other device drivers 122. Database of predetermined images 251 includes predetermined images, each of a known material and each captured at a magnification factor that is relatively high. Texture features 252 may include statistical texture features extracted from images, as discussed more fully below.

Non-volatile memory also stores image processing module 300. Image processing module 300 comprises computer-executable process steps for classifying an unknown material using texture. As shown in FIG. 2, image processing module 300 generally comprises an access module 301, a receiving module 302, a generation module 303, a matching module 304 and a classification module 305, each of which is discussed more fully below.

The computer-executable process steps for image processing module 300 may be configured as part of operating system 118, as part of an output device driver in output device drivers 121, or as a stand-alone application program. Image processing module 300 may also be configured as a plug-in or dynamic link library (DLL) to the operating system, device driver or application program. It can be appreciated that the present disclosure is not limited to these embodiments and that the disclosed modules may be used in other environments.

Figure 3:
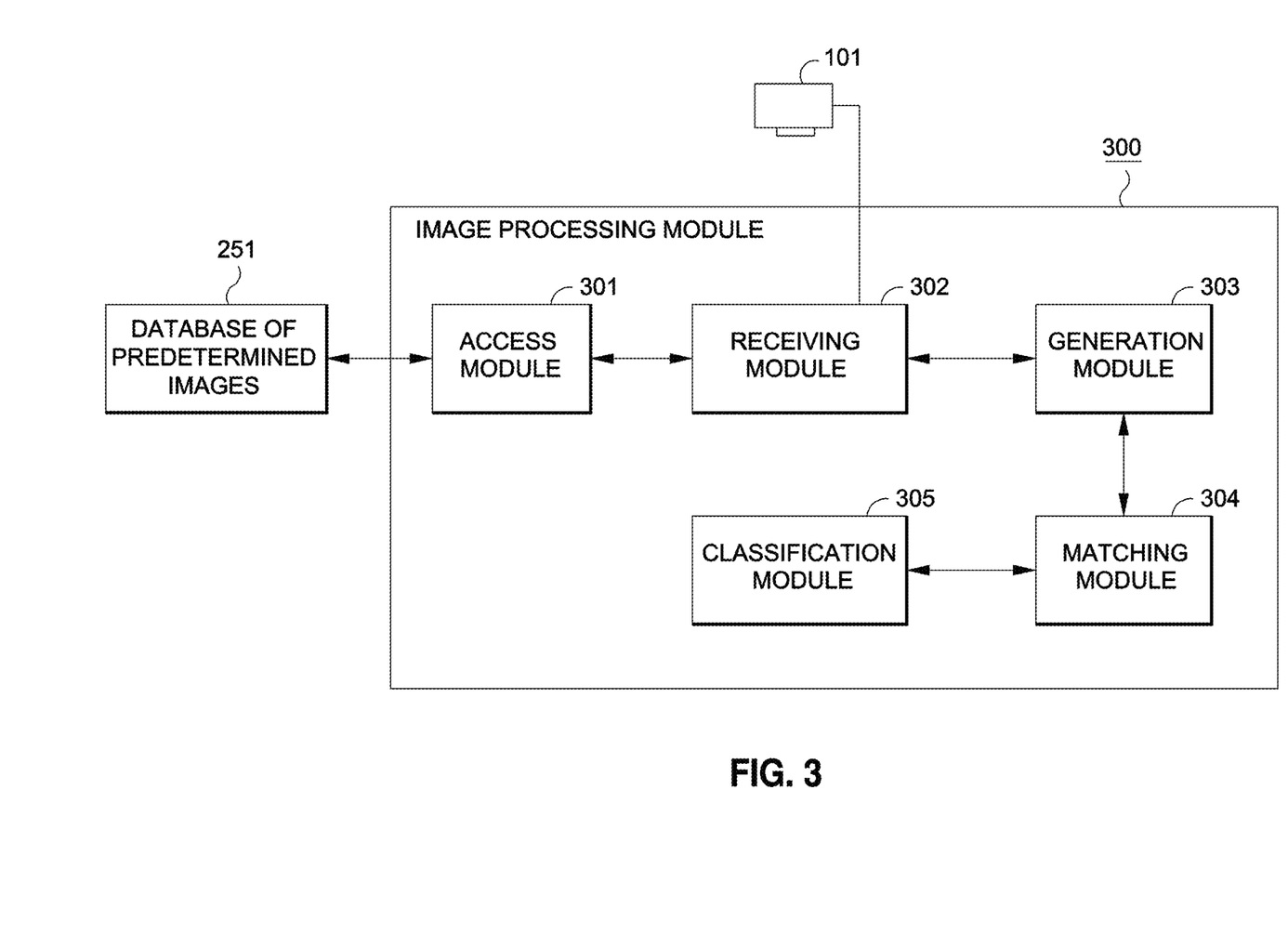
FIG. 3 illustrates an example of an image processing module according to an example embodiment.

FIG. 3 illustrates one example of an image processing module for classifying a material based on texture.

In particular, FIG. 3 illustrates an example of image processing module 300 in which the sub-modules of image processing module 300 are included in non-volatile memory 56. Specifically, FIG. 3 illustrates an example of an image processing module 300 for identifying or classifying an unknown material using texture. Image processing module 300 may comprise a number of sub-modules, as described more fully below. Each of the sub-modules are computer-executable software code or process steps executable by a processor, such as CPU 110, and are stored on a computer-readable storage medium, such as non-volatile memory 56 or RAM 115. More or less modules may be used, and other architectures are possible.

As shown in FIG. 3, image processing module 300 includes an access module 301 for accessing a database of predetermined images, each of a known material and each captured at a magnification factor that is relatively high. To that end, access module 301 communicates with database of predetermined images 251. Access module 301 also communicates with receiving module 302, which receives a query image of the unknown material captured at a second magnification factor that is relatively lower than the magnification factors of the predetermined images. Thus, receiving module 302 communicates with image capture device 101 to receive the query image. Image processing module 300 further includes generation module 303 for dynamically generating a collection of images of the known materials at the second magnification factor, and matching module 304 for matching the received query image against the dynamically generated collection of images. Classification module 305 is for classifying the unknown material in correspondence to a match between the received image and the dynamically generated collection of images. Each of these processes will be described more fully below.

Figure 4:
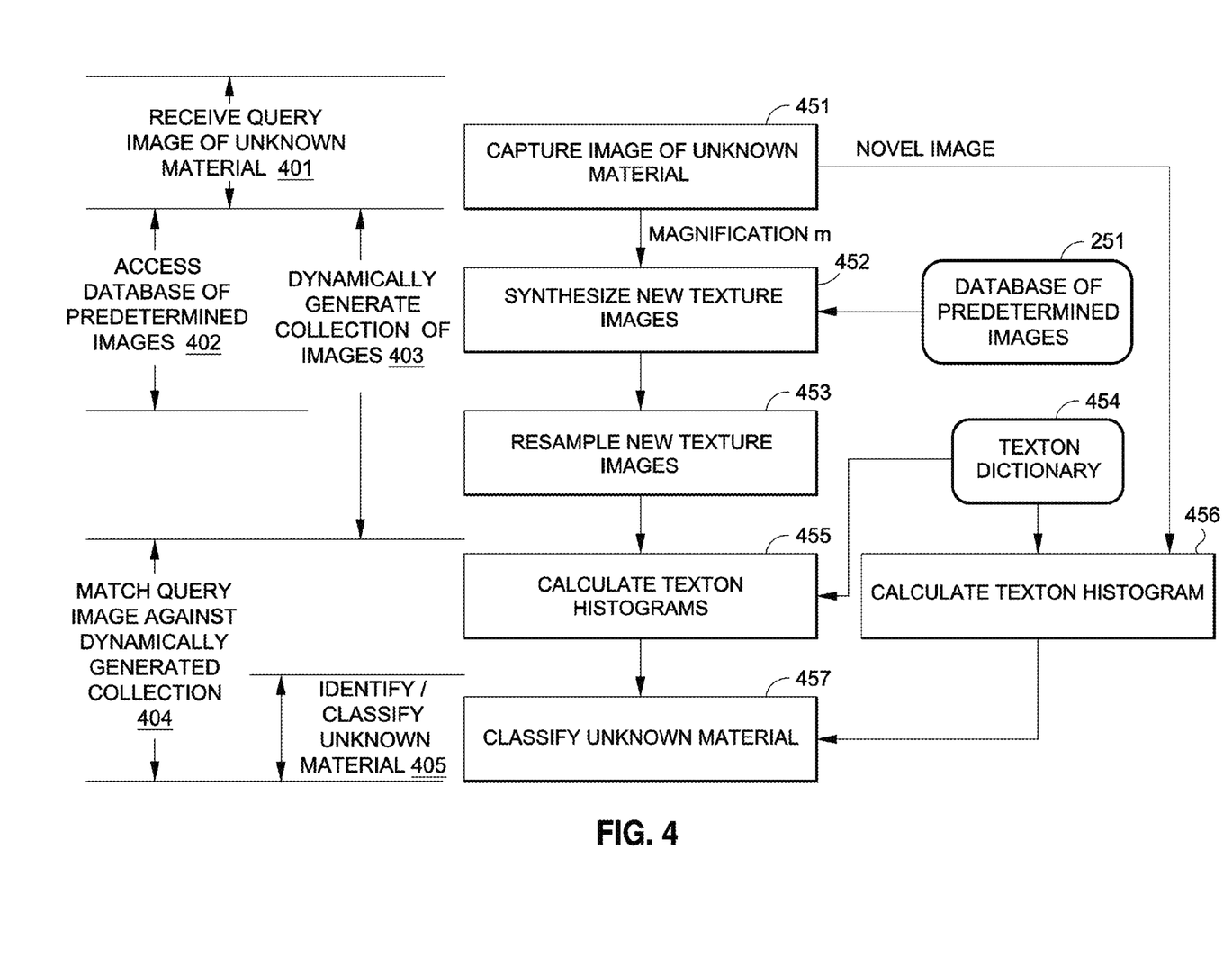
FIG. 4 is a flowchart illustrating a process for classifying a material using texture according to example embodiments.

FIG. 4 is a flowchart illustrating a process for identifying or classifying a material using texture according to an example embodiment.

Briefly, in FIG. 4, an unknown material is classified using texture. A database of predetermined images is accessed, each of a known material and each captured at a magnification factor that is relatively high. A query image of the unknown material is received. The query image is captured at a second magnification factor that is relatively lower than the magnification factors of the predetermined images. A collection of images of the known materials is dynamically generated at the second magnification factor. The received query image is matched against the dynamically generated collection of images, and the unknown material is classified in correspondence to a match between the received image and the dynamically generated collection of images.

Thus, at run-time, there is a dynamic generation of a collection of images of known materials, based on the magnification factor encountered in a query image of an unknown material. Features of the query image are matched against features of the images in the collection in order to classify the unknown material.

In more detail, in step 401, a query image of an unknown or unclassified material is received. The query image of the unknown material is captured (451) at a second magnification factor m, e.g., m=1:11, that is relatively lower than the magnification factor $m_0$, e.g., $m_0$=1:6, of the predetermined images.

For example, a query image can be received from image capture device 101 in FIG. 1, corresponding to a captured image of one of objects 104, 105 and 106. Of course, the query image could also be received in other contexts or from other sources, such as over a network.

In step 402, the database of predetermined images (251) is accessed, for example from non-volatile memory 56. The predetermined images are each of a known material, and are each captured at a magnification factor that is relatively high. The predetermined images can be texture images captured for different illuminations and camera directions, but may have a magnification factor fixed at some predetermined known value $m_0$, e.g., $m_0$=1:6. The predetermined images are generally not used directly in training a material classifier, but rather are used to generate training images at a new magnification factor, as discussed below. In some embodiments, the predetermined images may have a fixed size, e.g., 200×200 pixels.

In one example embodiment, the magnification factor of each predetermined image in the database of predetermined images is relatively high as compared against an expected range of magnification factors for query images of unknown materials, e.g., an expected range of 1:21 to 1:11. This range can be estimated, for example, based on knowledge of expected sizes of objects 104, 105 and 106 and the capability of the image capture device 101. In another example embodiment, each predetermined image in the database of predetermined images shares a common first magnification factor, e.g., 1:6, that is relatively high as compared to a second magnification factor, e.g., 1:11, of a captured query image.

The magnification factor of each image in the database of predetermined images can be the same for all images in the database, and the choice of this common magnification factor can be made, for example, during the creation of the database. In one example embodiment, each image in the database of predetermined images is captured at the highest magnification factor possible, based on the capability of the image capture device used and the physical sizes of the known material samples. Thus, the process of capturing images for the database can be controlled so that the predetermined images in the database share a common first magnification factor. As mentioned above, this common first magnification factor is denoted $m_0$.

In step 403, there is dynamic generation of a collection of images of the known materials at the second magnification factor (at which the query image is captured). Thus, new texture images of a larger size are dynamically synthesized (452) and then resampled (453).

In that regard, the current capture setting of an image capture device capturing the query image typically provides information about the second magnification factor m, e.g., m=1:11. Capture setting information, such as focusing distance, focal length or the like, can be directly communicated from image capture device 101 to receiving module 302, for example. As another example, when a query image is received at receiving module 302 from image capture device 101, metadata stored in the image may contain the capture setting. For example, Exif (Exchangeable Image File format) tags may contain information such as focusing distance, focal length or the like. A magnification factor may be either an absolute magnification factor or a relative magnification factor. Knowledge of the focusing distance and focal length can be used to derive an absolute magnification factor which is based on a ratio of physical sizes of an object and its captured image. In another example, if information about the focusing distance or focal length is not available, less precise capture setting information such as a zoom factor of a zoom lens, e.g., 3×, 5×, etc., can still be used to derive a relative magnification factor which is relative to a reference absolute magnification factor. Thus, in one example, receiving the query image of the unknown material captured includes receiving a capture setting used by an image capture device, and further includes using the received capture setting to derive the second magnification factor.

Meanwhile, the same information regarding absolute and/or relative magnification factor can also be captured during creation of the database of predetermined images, so as to obtain the first magnification factor $m_0$ for the images in the database.

Figure 7:
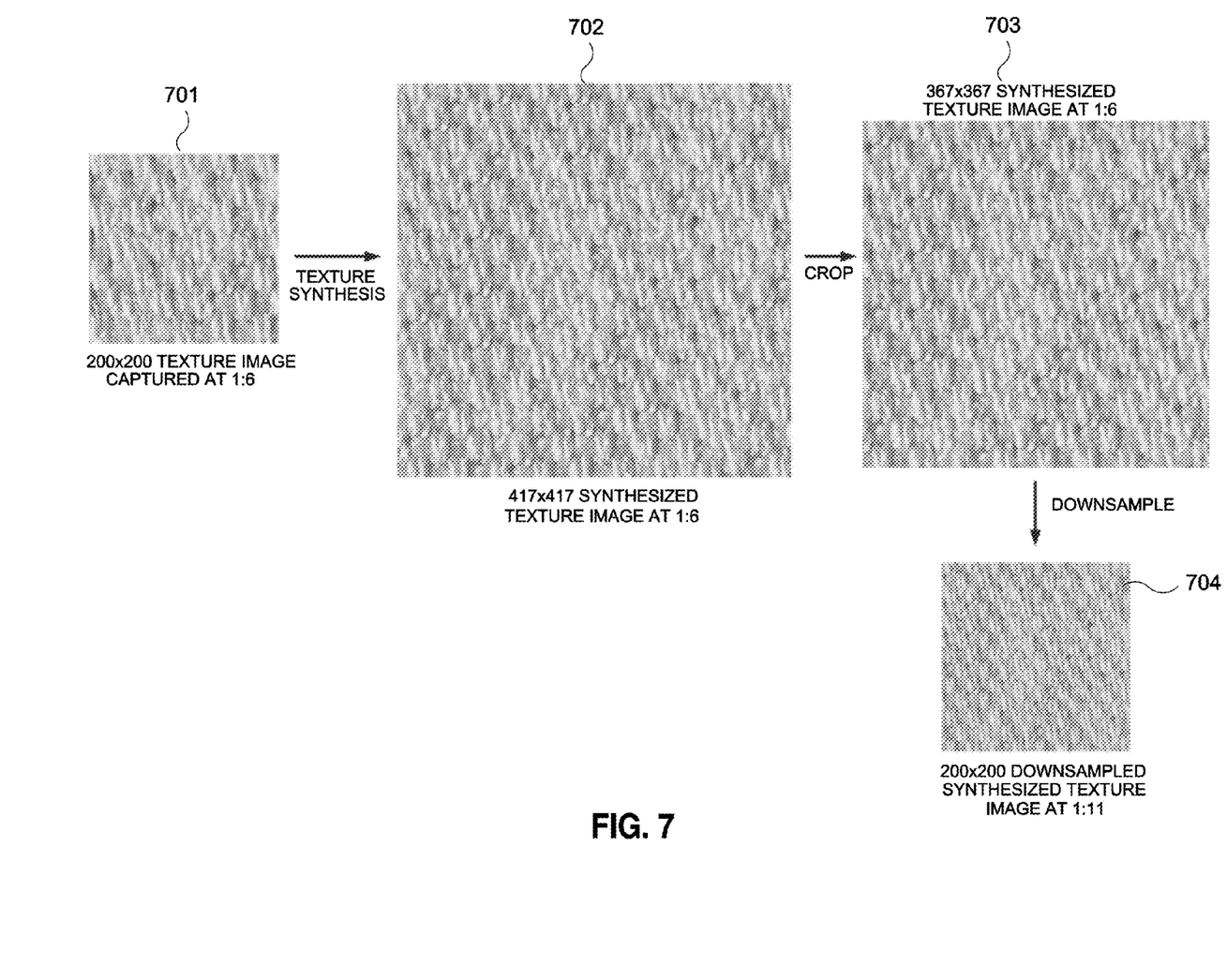
FIG. 7 is a view for explaining generation of a collection of images of known materials at a different magnification factor according to an example embodiment.

According to the disclosure, the predetermined texture images accessed in step 402 are used to dynamically generate new texture images at a new magnification factor, as shown in FIG. 7. For example, if the image size of the received query image at step 401 is $H_0 \times W_0$, a predetermined texture image 701 is used to synthesize a new texture image 702 at a new size H×W, where:

$$H \geq H_0 \cdot \frac{m_0}{m},$$

$$W \geq W_0 \cdot \frac{m_0}{m}.$$

Thus, knowing the second magnification factor of the query image m and the magnification factor of the predetermined database image $m_0$, a magnification ratio between the magnification factor for the predetermined image and the second magnification factor can be determined as $m_0/m$. In addition, using the knowledge of the size of the received image ($H_0 \times W_0$), a target size for the new texture image 702 (H×W) which is at least the size of the received image multiplied by the magnification ratio can be determined. The new texture image ordinarily will be a larger size than the query image. In particular, as discussed above, $m_0$ is generally chosen to be a higher magnification than the magnification m of the query image so that the magnification ratio $m_0/m$ is larger than one. Therefore, the size H×W of the new synthesized image will ordinarily be larger than the size of the query image. In one example simply for purposes of illustration, $H_0=W_0=200$, $m_0=1:6$, and m=1:11, so that $$H_0 \cdot \frac{m_0}{m} = W_0 \cdot \frac{m_0}{m} = 366\frac{2}{3}.$$

If we choose H=W=367 pixels, then the above conditions on H and W are satisfied. Another valid choice is H=W=417 pixels, for example.

For the synthesis, any texture synthesis algorithm may be used. For example, an algorithm based on image quilting may be used. For example, synthesizing a novel image from the predetermined image comprises replication of a part of the predetermined image and quilting of the replicated parts of the image. As can be seen in the example in FIG. 7, this algorithm synthesizes novel texture image 702 with size 417× 417 at the same magnification factor as the predetermined database image, which is at magnification factor 1:6 in this example.

The relatively large synthesized texture image may optionally be cropped to a cropped image 703 at the target size, e.g., 367×367. For example, the synthesized image may not be at the target size because the texture synthesis algorithm used may produce a synthesized texture image of a different size, e.g., 417×417, that is larger than the target size, e.g., 367×367. In this case, an optional step of cropping may be applied to obtain a synthesized texture image of size 367×367. Note that with cropping or not, the resulting synthesized texture image is at the same magnification factor as the predetermined database image.

The synthesized new texture images may then be reduced in size by a factor equal to the magnification ratio $m_0/m$. This may comprise downsampling or resampling to produce downsampled synthesized texture image 704. As an example shown in FIG. 7, this corresponds to downsampling the synthesized texture image of size 367×367 to 200×200, a reduction factor of 11/6. In another example not shown in FIG. 7, cropping is not performed, and the synthesized texture image of size 417×417 is reduced in size by a factor of 11/6 via downsampling to a downsampled synthesized texture image of size 227×227.

Thus, according to this example embodiment, the process of dynamically generating a collection of images includes, for each predetermined image in the database of predetermined images, determining a magnification ratio between the magnification factor for the predetermined image and the second magnification factor for the received query image, synthesizing from the predetermined image a novel image of a size at least the size of the received image multiplied by the magnification ratio, and reducing the size of the synthesized novel image by a factor equal to the magnification ratio. In one aspect, reducing the size of the synthesized novel image includes downsampling, whereas in another aspect, reducing the size of the synthesized novel image includes resampling.

The downsampled synthesized texture images 704, i.e., the dynamically generated collection of images at the second magnification factor, are then used as training images to calculate texture models or texton histograms to compare to corresponding texture models or texton histograms of the query image, as discussed below.

Thus, returning to FIG. 4, step 403, in some examples the dynamic generation of the collection of images includes reducing the magnification of each corresponding one of the predetermined images to the second magnification factor (i.e., the magnification factor at which the query image was captured), by resampling (453) or downsampling an image synthesized from each corresponding one of the predetermined images, wherein the synthesized image and the corresponding one of the predetermined images have the same magnification factor. Thus, in the example shown in FIG. 7, the magnification is reduced from 1:6, the magnification factor of each corresponding one of the predetermined images, to 1:11, the second magnification factor.

In one example, the dynamically generated collection of images includes images corresponding to all or substantially all of the predetermined images in the database of predetermined images. For example, the number of predetermined database images might be small enough so that dynamically generating a new image for each predetermined image is not overly burdensome on CPU 110 or memory 115.

In an example embodiment comprising the machine vision application to recycling shown in FIG. 1, the number of predetermined database images might be relatively small, because the number of materials to be classified is relatively small (e.g., only a few, in some cases up to 10, recyclable materials are of interest or valuable from an economic standpoint) and the number of predetermined texture images per material is also relatively small (e.g., approximately 10 images per material).

It is also possible to narrow the dynamically generated collection of images to a subset, so as to reduce processing requirements. Accordingly, in another aspect, the dynamically generated collection of images includes images corresponding to substantially fewer than all of the predetermined images in the database of predetermined images, and a subset of predetermined images is selected for inclusion in the dynamically generated collection of images. The selection is based at least in part on a screening criterion. For example, the database of predetermined images might cover a wide range of materials, and the screening criterion is based on a specific application, such as recycling. In other words, only materials that are valuable for recycling are selected for inclusion in the dynamically generated collection of images.

Returning again to FIG. 4, in step 404, the query image is matched against the dynamically generated collection of images. In particular, there is derivation of statistical texture features of the dynamically generated images and of the query image. The features are then compared to determine if there is a match.

In more detail, the statistical texture features are texton histograms that are calculated (455) based on a predetermined texton dictionary (454). A texton can be thought of as an elementary building block of texture, although a precise definition is tied to a particular implementation, e.g., using filter banks, as explained below. A texton dictionary is a collection of specially chosen filter bank response vectors that collectively are sufficient for building a filter bank response vector of any arbitrary texture. A texton dictionary is typically predetermined and trained from a relatively large set of texture images, which may or may not include the database of predetermined images 251.

Figure 5:
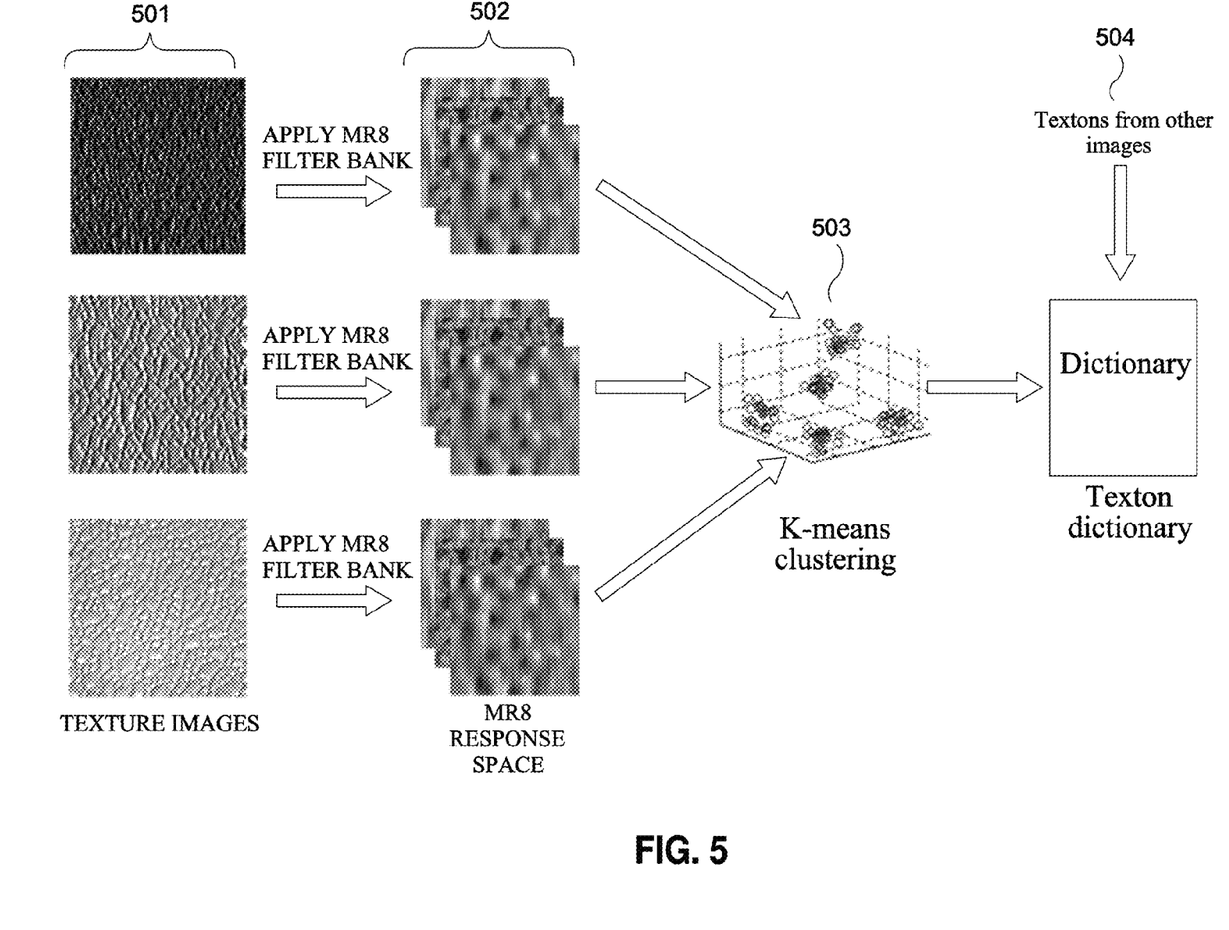
FIG. 5 is a view for explaining generation of a texton dictionary according to an example embodiment.
Figure 6:
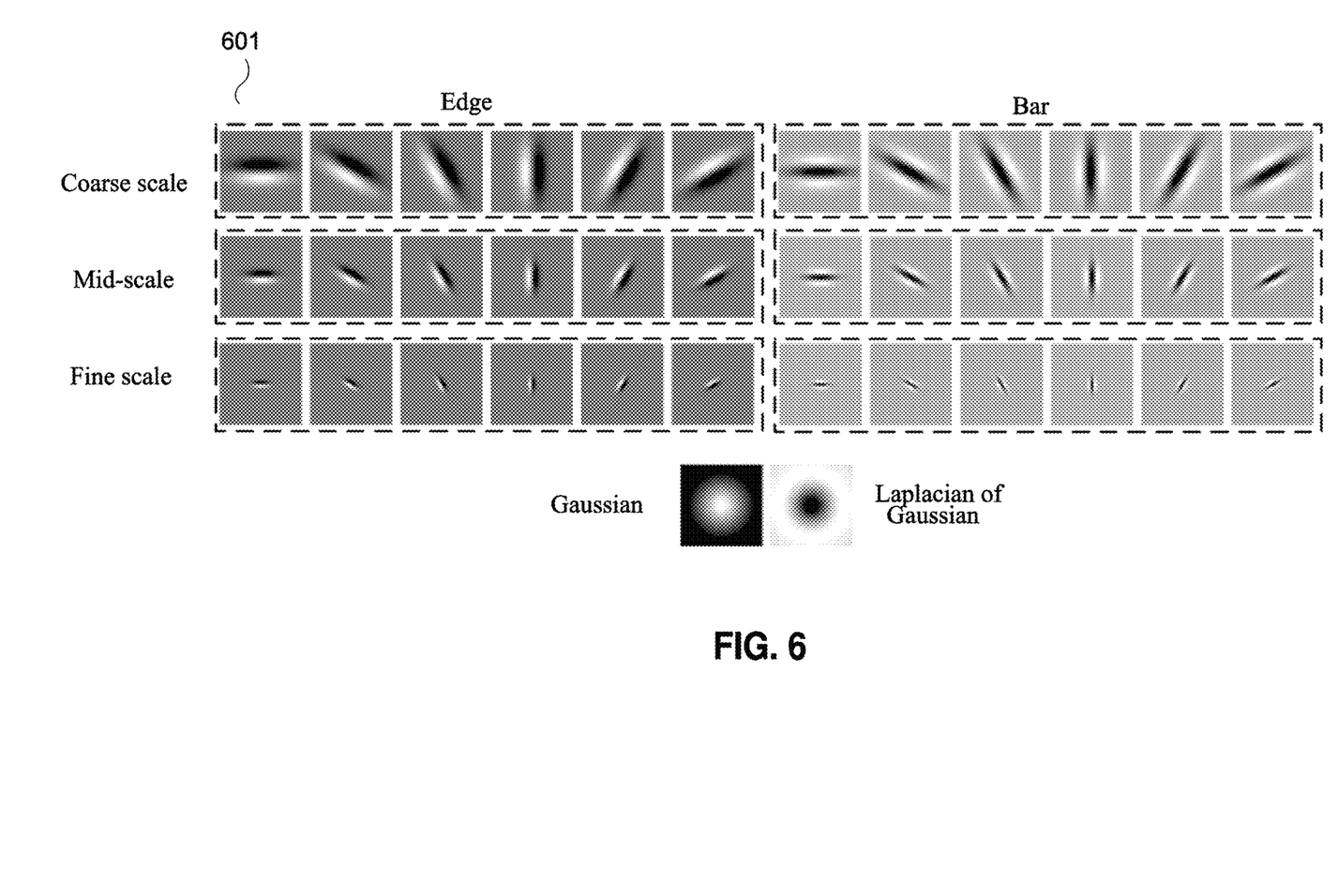
FIG. 6 is a view for explaining feature extraction according to an example embodiment.

A general process of generating a texton dictionary will now be described with respect to FIGS. 5 and 6.

A sufficiently large set of texture images 501 of different materials is chosen. Referring to FIG. 5, to generate a predetermined texton dictionary, each pixel of every texture image in the set of texture images 501 is converted to a filter bank response vector by applying a filter bank to the texture image. In one embodiment, the filter bank used is called MR8 filter bank with 8 responses, based on 38 filters which are depicted in FIG. 6. As can be seen from FIG. 6, there are six sets of anisotropic filters for detecting edges and bars at different scales, and two isotropic filters for detecting spots and blobs. "MR" refers to "Maximum Response", which means that each of the six sets of anisotropic filters produces only one response by taking the maximum absolute value of the filter responses, so as to help ensure rotational invariance of the resulting filter bank. Of course, other filter banks or response vectors unrelated to filter banks are possible.

Returning to FIG. 5, using the MR8 filter bank, the MR8 response space 502 is 8-dimensional. Each pixel is transformed into a response vector in this space by applying the MR8 filter bank. Put another way, each pixel is represented as a point in this 8-dimensional response space. A texton is a response vector in the MR8 response space that corresponds to a cluster center.

A K-means clustering 503 is applied to determine the cluster centers, which are taken as the textons. The textons constitute the texton dictionary 454. In an example embodiment, the number K of cluster centers, or textons, is chosen to be K=600. In other words, there are 600 textons in the texton dictionary. More generally, this number can be in the range from tens to hundreds or more, depending on the requirement of the texton dictionary to represent arbitrary texture.

In that regard, it is possible to perform K-means clustering on several sets of texture images, where each process produces a set of textons. The final texton dictionary 454 is then taken to be a collection of all the textons determined.

Returning to FIG. 4, texton histograms corresponding to each of the images in the dynamically generated collection of images (403) are calculated (455), and a texton histogram for the query image of the unknown material (401) is calculated (456). A texton histogram is referred to as a statistical texture feature. According to an embodiment, a texton histogram for the query image of the unknown material (401) is derived. In addition, texton histograms corresponding to each of the images in the dynamically generated collection of images (403) are dynamically derived. The process of deriving a texton histogram for the query texture image and each of the texture images in the dynamically generated collection of images will now be described.

Figure 8:
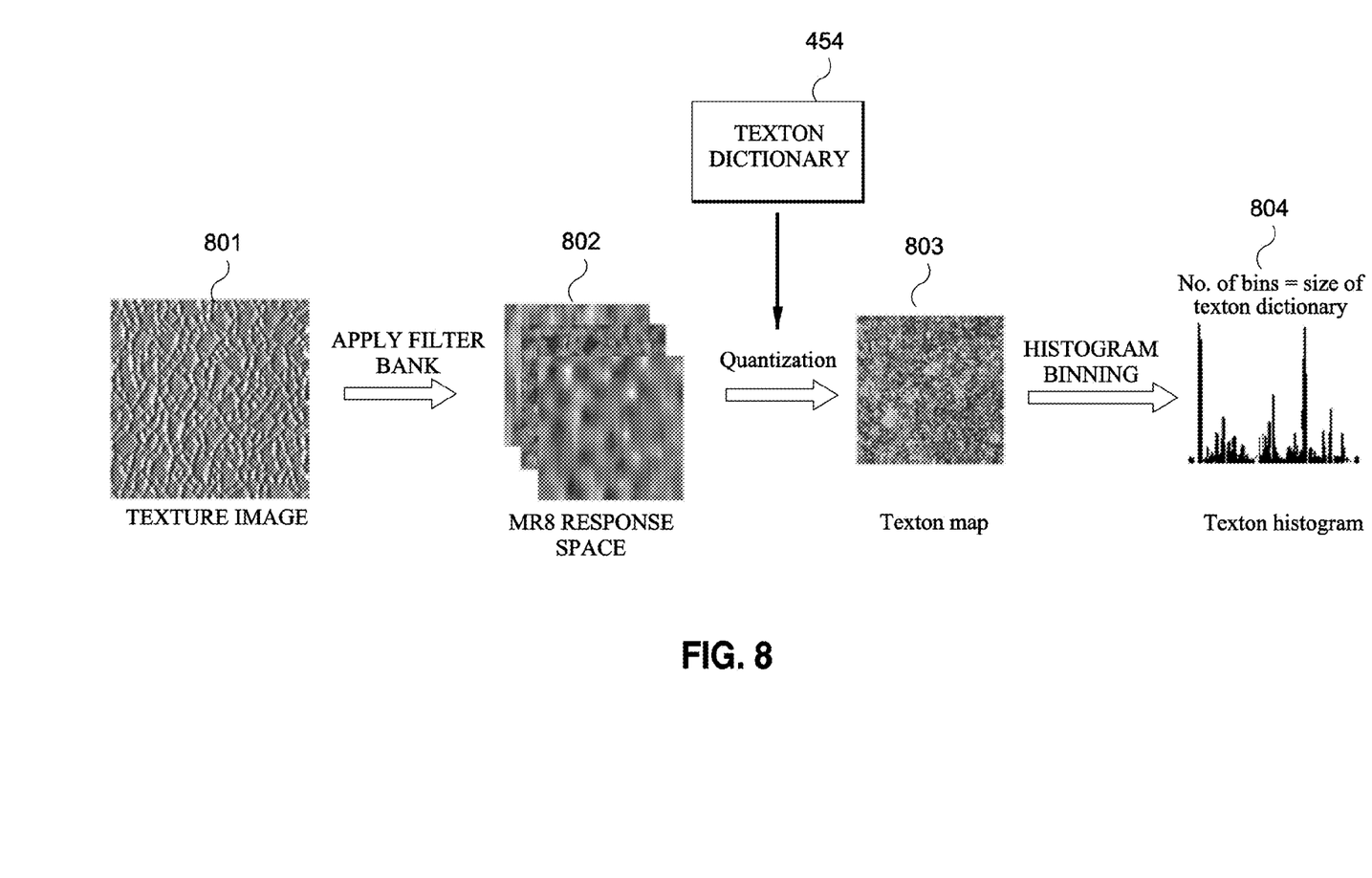
FIG. 8 is a view for explaining a texton histogram according to an example embodiment.

Accordingly, and referring now to FIG. 8, each texture image 801 is transformed into MR8 response vectors 802 by applying the MR8 filter bank. Using texton dictionary 454, each response vector is quantized to the nearest texton in texton dictionary 454. This results in texton map 803. A texton histogram 804 is derived by counting the frequency of occurrence of each texton in texton map 803 by histogram binning. Note that the spatial information in texton map 803 is discarded in the process to obtain texton histogram 804.

Returning to FIG. 4 again, in an example embodiment, the texton histogram for the query image (456) is matched against the texton histograms for the dynamically generated collection of images (455). The closest histogram from the texton histograms for the dynamically generated collection of images determines the material classification (457) of the query image. More specifically, the closest histogram corresponds to one of the images in the dynamically generated collection of images, while the one of the images in the dynamically generated collection of images corresponds to a known material. A typical distance for histograms, which can be used for matching histograms, is the $\chi^2$ distance, defined by:

$$\chi^2(h, k) = \frac{1}{2} \sum_{i=1}^{N} \frac{(h_i - k_i)^2}{h_i + k_i},$$

where $h=(h_1, h_2, \ldots, h_N)$, $k=(k_1, k_2, \ldots, k_N)$ are the histograms to be compared, and N is the number of bins of the histograms. Of course, other methods of matching histograms are possible.

In some aspects, a preprocessing step may be performed to the texture images. For example, since most images are captured in the RGB space, color information can be discarded by converting all images to grayscale. Typically, small cropped images, such as size of 200×200 pixels, can be used. Also, to reduce the effect of global (uniform) illumination, the texture images can be normalized to zero mean and unit variance. The filters in the filter bank can also be L1-normalized so that different axes of the response space have the same scale. Finally, the response vectors F can be normalized by:

$$F \leftarrow F \cdot \frac{\log(1 + \|F\|_2 / 0.03)}{\|F_2\|},$$

a scaling motivated by Weber's law.

Thus, in this example embodiment, a statistical texture feature for the query image of the unknown material is derived, and statistical texture features corresponding to each of the images in the dynamically generated collection of images are dynamically derived. Matching of the received query image against the dynamically generated collection of images includes matching of the statistical texture features for the received query image against the statistical texture features for the dynamically generated collection of images. In this example, the statistical texture features each include a histogram of textons.

In an example where the synthesized novel images are reduced in size, a statistical texture feature is derived for the query image of the unknown material, and statistical texture features are dynamically derived for each of the reduced size synthesized novel images. Matching of the received query image against the dynamically generated collection of images includes matching of the statistical texture features for the received query image against the statistical texture features for the reduced size synthesized novel images.

In step 405, the unknown material is identified or classified in correspondence to a match between the received image and the dynamically generated collection of images.

The following table depicts a confusion matrix as a result of an exemplary run by applying a material classifier dynamically scaled from magnification factor 1:6 to magnification factor 1:11 to actual samples captured at magnification 1:11. Each row corresponds to one of eight materials that are being targeted for classification. The columns correspond to result of the classification. It can be seen that in general, the recognition rate is very high.

|  | Classified As | | | | | | | |
| --- | --- | --- | --- | --- | --- | --- | --- | --- |
|  | 1 | 2 | 3 | 4 | 5 | 6 | 7 | 8 |
| Material 1 | 83% | 0% | 0% | 0% | 0% | 0% | 17% | 0% |
| Material 2 | 0% | 67% | 0% | 0% | 0% | 0% | 0% | 33% |
| Material 3 | 0% | 0% | 100% | 0% | 0% | 0% | 0% | 0% |
| Material 4 | 0% | 0% | 0% | 100% | 0% | 0% | 0% | 0% |
| Material 5 | 0% | 0% | 0% | 0% | 100% | 0% | 0% | 0% |
| Material 6 | 0% | 0% | 0% | 0% | 0% | 100% | 0% | 0% |
| Material 7 | 0% | 0% | 0% | 0% | 0% | 0% | 92% | 8% |
| Material 8 | 0% | 0% | 0% | 0% | 0% | 0% | 0% | 100% |

By dynamically generating a collection of images of known materials in accordance with a magnification factor of an image of an unknown material, it is ordinarily possible to classify the material regardless of the magnification factor of the image, while reducing the need to predetermine training images at every possible magnification factor.

<Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of classifying an unknown material using texture, comprising:
   accessing a database of predetermined images each of a known material and each captured at a magnification factor that is relatively high;
   receiving a query image of the unknown material captured at a second magnification factor that is relatively lower than the magnification factors of the predetermined images;
   dynamically generating a collection of images of the known materials at the second magnification factor;
   matching the received query image against the dynamically generated collection of images; and
   classifying the unknown material in correspondence to a match between the received image and the dynamically generated collection of images.

2. The method according to claim 1 further comprising:
   deriving a statistical texture feature for the query image of the unknown material; and
   dynamically deriving statistical texture features corresponding to each of the images in the dynamically generated collection of images,
   wherein matching of the received query image against the dynamically generated collection of images comprises matching of the statistical texture feature for the received query image against the statistical texture features for the dynamically generated collection of images.

3. The method according to claim 2, wherein the statistical texture features each comprise a histogram of textons.

4. The method according to claim 1, wherein for each predetermined image in the database of predetermined images, the step of dynamically generating a collection of images comprises:
   determining a magnification ratio between the magnification factor for the predetermined image and the second magnification factor for the received query image;
   synthesizing from the predetermined image a novel image of a size at least the size of the received image multiplied by the magnification ratio; and
   reducing the size of the synthesized novel image by a factor equal to the magnification ratio.

5. The method according to claim 4, wherein reducing the size of the synthesized novel image comprises downsampling.

6. The method according to claim 4, wherein reducing the size of the synthesized novel image comprises resampling.

7. The method according to claim 4, wherein synthesizing a novel image from the predetermined image comprises replication of a part of the predetermined image and quilting of the replicated parts of the image.

8. The method according to claim 4, further comprising:
   deriving a statistical texture feature for the query image of the unknown material; and
   dynamically deriving statistical texture features for each of the reduced size synthesized novel images,
   wherein matching of the received query image against the dynamically generated collection of images comprises matching of the statistical texture feature for the received query image against the statistical texture features for the reduced size synthesized novel images.

9. The method according to claim 1, wherein each predetermined image in the database of predetermined images shares a common first magnification factor that is relatively high as compared to the second magnification factor.

10. The method according to claim 1, wherein the magnification factor of each predetermined image in the database of predetermined images is relatively high as compared against an expected range of magnification factors for query images of unknown materials.

11. The method according to claim 1, wherein the dynamically generated collection of images comprises images corresponding to all or substantially all of the predetermined images in the database of predetermined images.

12. The method according to claim 1, wherein the dynamically generated collection of images comprises images corresponding to substantially fewer than all of the predetermined images in the database of predetermined images, and further comprising selection of a subset of predetermined images for inclusion in the dynamically generated collection of images, wherein the selection is based at least in part on a screening criterion.

13. The method according to claim 1, wherein receiving the query image of the unknown material captured includes receiving a capture setting used by an image capture device and further includes using the received capture setting to derive the second magnification factor.

14. The method according to claim 1, wherein a magnification factor is an absolute magnification factor based on a ratio of physical sizes of an object and its captured image.

15. The method according to claim 1, wherein a magnification factor is a relative magnification factor that is relative to a reference absolute magnification factor.

16. The method according to claim 1, wherein the dynamic generation of the collection of images comprises reducing the magnification of each corresponding one of the predetermined images to the second magnification factor.

17. An apparatus for classifying an unknown material using texture, comprising:
   a computer-readable memory constructed to store computer-executable process steps; and
   a processor constructed to execute the computer-executable process steps stored in the memory;
   wherein the process steps stored in the memory cause the processor to:
   access a database of predetermined images, each of a known material and each captured at a magnification factor that is relatively high;
   receive a query image of the unknown material captured at a second magnification factor that is relatively lower than the magnification factors of the predetermined images;
   dynamically generate a collection of images of the known materials at the second magnification factor;
   match the received query image against the dynamically generated collection of images; and
   classify the unknown material in correspondence to a match between the received image and the dynamically generated collection of images.

18. The apparatus according to claim 17, wherein the process steps stored in the memory further cause the processor to:
   derive a statistical texture feature for the query image of the unknown material; and
   dynamically derive statistical texture features corresponding to each of the images in the dynamically generated collection of images,
   wherein matching of the received query image against the dynamically generated collection of images comprises matching of the statistical texture feature for the received query image against the statistical texture features for the dynamically generated collection of images.

19. The apparatus according to claim 17, wherein for each predetermined image in the database of predetermined images, the step of dynamically generating a collection of images comprises:
  determining a magnification ratio between the magnification factor for the predetermined image and the second magnification factor for the received query image;
  synthesizing from the predetermined image a novel image of a size at least the size of the received image multiplied by the magnification ratio; and
  reducing the size of the synthesized novel image by a factor equal to the magnification ratio.

20. A non-transitory computer-readable storage medium on which is stored computer-executable process steps for causing a computer to perform a method for classifying an unknown material using texture, the method comprising:
  accessing a database of predetermined images each of a known material and each captured at a magnification factor that is relatively high;
  receiving a query image of the unknown material captured at a second magnification factor that is relatively lower than the magnification factors of the predetermined images;
  dynamically generating a collection of images of the known materials at the second magnification factor;
  matching the received query image against the dynamically generated collection of images; and
  classifying the unknown material in correspondence to a match between the received image and the dynamically generated collection of images.

* * * * *